(12) United States Patent
Amidi

(10) Patent No.: US 8,396,280 B2
(45) Date of Patent: Mar. 12, 2013

(54) APPARATUS AND METHOD FOR INSPECTING ASSETS IN A PROCESSING OR OTHER ENVIRONMENT

(75) Inventor: Soroush Amidi, Montreal (CA)

(73) Assignee: Honeywell International Inc., Morristown, NJ (US)

(*) Notice: Subject to any disclaimer, the term of this patent is extended or adjusted under 35 U.S.C. 154(b) by 479 days.

(21) Appl. No.: 11/606,814

(22) Filed: Nov. 29, 2006

(65) Prior Publication Data

US 2008/0123934 A1 May 29, 2008

(51) Int. Cl.
*G06K 9/00* (2006.01)

(52) U.S. Cl. ........... 382/141; 348/231.99; 348/207.99

(58) Field of Classification Search ............ 382/141; 348/340, 231
See application file for complete search history.

(56) References Cited

U.S. PATENT DOCUMENTS

| | | | |
|---|---|---|---|
| 5,926,103 | A | 7/1999 | Petite |
| 5,995,936 | A * | 11/1999 | Brais et al. ............ 704/275 |
| 6,116,815 | A | 9/2000 | Chen |
| 6,192,257 | B1 | 2/2001 | Ray |
| 6,317,039 | B1 | 11/2001 | Thomason |
| 6,415,646 | B1 | 7/2002 | Kessel et al. |
| 6,499,016 | B1 | 12/2002 | Anderson |
| 6,721,001 | B1 | 4/2004 | Berstis |
| 6,775,625 | B2 | 8/2004 | Burkhardt et al. |
| 7,347,781 | B2 | 3/2008 | Schultz |
| 7,688,198 | B2 | 3/2010 | Amidi |
| 8,059,882 | B2 * | 11/2011 | Amidi ............ 382/141 |
| 2002/0198997 | A1 | 12/2002 | Linthicum et al. |
| 2003/0225707 | A1 * | 12/2003 | Ehrman et al. ........... 705/64 |
| 2004/0105006 | A1 | 6/2004 | Lazo et al. |
| 2004/0145485 | A1 | 7/2004 | Tice |
| 2005/0062677 | A1 * | 3/2005 | Nixon et al. ............ 345/2.1 |
| 2005/0182650 | A1 | 8/2005 | Maddox, Jr. et al. |
| 2006/0176169 | A1 | 8/2006 | Doolin et al. |
| 2006/0255265 | A1 | 11/2006 | Dalzell |
| 2007/0132576 | A1 | 6/2007 | Kolavennu et al. |

(Continued)

FOREIGN PATENT DOCUMENTS

| | | |
|---|---|---|
| DE | 3634628 A1 | 4/1987 |
| EP | 1501029 A2 | 1/2005 |

(Continued)

OTHER PUBLICATIONS

"PanOS Platform, Unified Location Management Platform," PanGo, 2007, 2 pages.

(Continued)

*Primary Examiner* — Chieh M Fan
*Assistant Examiner* — Antoinette Spinks

(57) ABSTRACT

A portable asset inspection device can be used during the inspection of one or more assets, such as assets in a processing or other environment. A camera in the portable asset inspection device can be used to take digital photographs of assets being inspected. A sound recorder in the portable asset inspection device can be used to record oral notes of a user or other sounds associated with the inspection of the assets. Other data could be collected from the user using the portable asset inspection device. The collected data can be transmitted in either real-time or non-real-time to an external system. The external system could associate photographs, sound recordings, and other data with specific assets, such as by automatically storing the data in records associated with the correct assets. The external system could also use the data in any suitable manner, such as to schedule asset maintenance.

20 Claims, 4 Drawing Sheets

U.S. PATENT DOCUMENTS

| | | |
|---|---|---|
| 2007/0132577 A1 | 6/2007 | Kolavennu |
| 2007/0132637 A1 | 6/2007 | Kolavennu et al. |
| 2007/0205886 A1 | 9/2007 | Huseth et al. |
| 2007/0241965 A1 | 10/2007 | Kolavennu et al. |
| 2007/0268884 A1 | 11/2007 | Kolavennu et al. |
| 2008/0177665 A1 | 7/2008 | Noordam |
| 2008/0180319 A1 | 7/2008 | Islam et al. |
| 2008/0208962 A1* | 8/2008 | Kim et al. .................... 709/203 |

FOREIGN PATENT DOCUMENTS

| | | |
|---|---|---|
| EP | 1657610 A2 | 5/2006 |
| JP | 2004128541 | 4/2004 |
| WO | WO 2004/057325 A1 | 7/2004 |
| WO | WO 2008/067236 A2 | 6/2008 |

OTHER PUBLICATIONS

"Ekahau T301-A Wi-Fi Tag," ekahau, 2007, 2 pages.

Honeywell Process Solutions, "Mobile Station", Honeywell, 2 pages, (No date).

Honeywell Process Solutions, "IntelaTrac PKS", Honeywell, Sep. 9, 2006, 2 pages.

"n-sight: The Mobile Video Collaboration System (MVCS)", LibreStream, 2007, 5 pages.

* cited by examiner

APPARATUS AND METHOD FOR INSPECTING ASSETS IN A PROCESSING OR OTHER ENVIRONMENT

TECHNICAL FIELD

This disclosure relates generally to portable devices and more specifically to an apparatus and method for inspecting assets in a processing or other environment.

BACKGROUND

Processing environments often include a large number of assets as well as many differing types of assets. Example processing environments include manufacturing plants, chemical plants, crude oil refineries, ore processing plants, and mines. Example assets include valves, motors, pipes, gauges, vessels, and any other of a wide variety of devices or components. The assets in a processing environment may be inspected routinely to ensure proper operation of the assets or to detect potential problems with the assets. Inspectors routinely carry various objects, such as notepads and digital cameras, that are used to record information about the assets being inspected.

SUMMARY

This disclosure provides an apparatus and method for inspecting assets in a processing or other environment.

In a first embodiment, an apparatus includes a camera operable to capture an image of an asset. The apparatus also includes a sound recorder operable to capture a sound associated with an inspection of the asset. In addition, the apparatus includes an interface operable to transmit the image of the asset and the sound associated with the inspection of the asset.

In particular embodiments, the sound recorder is operable to capture one or more oral notes from a user inspecting the asset.

In other particular embodiments, the apparatus further includes a display operable to present a form to a user and one or more controls operable to receive input from the user. The input represents data associated with the asset. Also, the interface is further operable to transmit the data provided by the user.

In a second embodiment, a method includes capturing an image of an asset at a portable device. The method also includes recording a sound associated with an inspection of the asset at the portable device. In addition, the method includes communicating the image of the asset and the sound associated with the inspection of the asset.

In a third embodiment, a computer program is embodied on a computer readable medium and is operable to be executed by a processor. The computer program includes computer readable program code for receiving an image of a specific asset and a sound recording associated with an inspection of the specific asset. The computer program also includes computer readable program code for associating the received image and sound recording with the specific asset. In addition, the computer program includes computer readable program code for analyzing the image and the sound recording to determine at least one characteristic of the specific asset.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
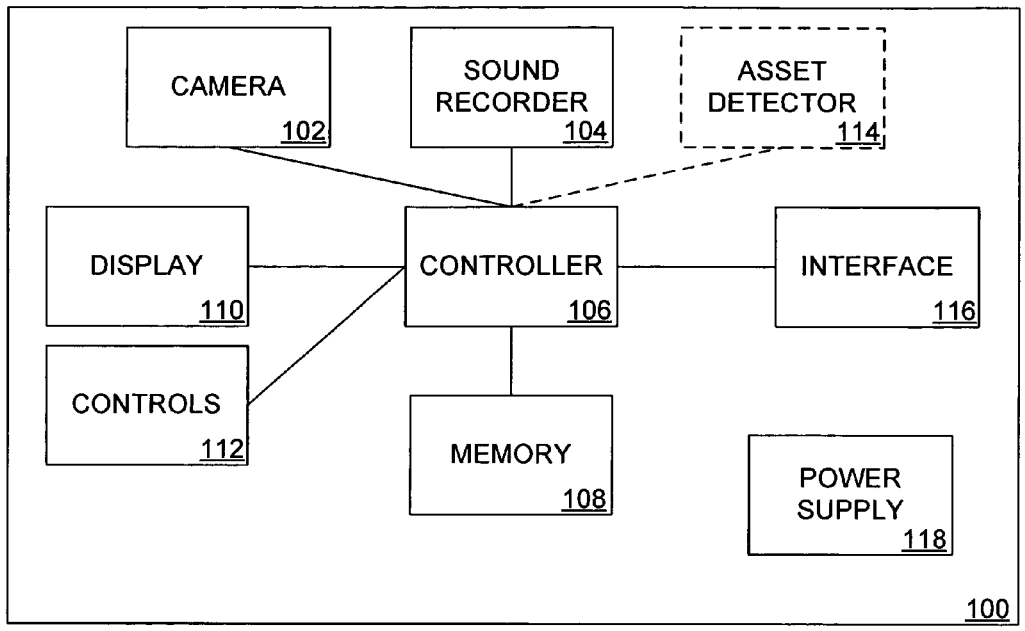
FIG. 1 illustrates an example asset inspection device according to one embodiment of this disclosure.

FIG. 1 illustrates an example asset inspection device 100 according to one embodiment of this disclosure. The embodiment of the asset inspection device 100 shown in FIG. 1 is for illustration only. Other embodiments of the asset inspection device 100 may be used without departing from the scope of this disclosure.

In this example, the asset inspection device 100 collects data associated with one or more assets in a processing or other environment. This could include photographs, voice or sound recordings, and other data captured by the asset inspection device 100. The asset inspection device 100 can communicate this data to an external system, which can associate the data with one or more particular assets, such as by automatically storing the data in records associated with the correct assets. In this way, accurate and reliable information about the assets can be obtained and associated with the appropriate assets for later use, such as in scheduling maintenance or determining the overall health of a processing or other environment.

In this example, the asset inspection device 100 includes a camera 102 capable of capturing digital images. The camera 102 allows a user to take digital photographs of assets in a processing or other environment. The assets could represent any suitable devices or components in a manufacturing, production, or other processing system. The camera 102 includes any suitable structure capable of capturing images. The camera 102 could, for example, represent a low-resolution digital camera, such as a one-megapixel or three-megapixel camera. However, a camera 102 supporting any suitable resolution for a particular application could be used.

The asset inspection device 100 also includes a sound recorder 104 capable of recording voices or other sounds. The sound recorder 104 allows the asset inspection device 100 to capture voice recordings from the user who is inspecting an asset. For example, the sound recorder 104 could be used to capture the user's comments regarding the condition of an asset or any problems noted with the asset during an inspection. The sound recorder 104 could also be used to capture sounds associated with the operation of the asset. The sound recorder 104 includes any suitable structure capable of capturing voice or other sounds recordings. The sound recorder 104 could, for example, represent a low-quality recording device. However, a sound recorder 104 supporting any suitable recording quality for a particular application could be used.

A controller 106 is coupled to the camera 102 and the sound recorder 104. The controller 106 performs various functions related to the operation of the asset inspection device 100. For example, the controller 106 could receive digital images and digitized sound recordings and store this data in a memory 108. The controller 106 could also facilitate communication of the digital images and digitized sound recordings to an external system. The controller 106 could further present various data to a user on a display 110 and receive input from the user through one or more controls 112. The controls 112 could allow the user to alter or control the operation of the asset inspection device 100, such as by triggering the capture of an image using the camera 102 or by initiating a recording using the sound recorder 104. The controller 106 includes any hardware, software, firmware, or combination thereof for performing various operations in the asset inspection device 100. The controller 106 could, for example, represent a microprocessor, digital signal processor, application specific integrated circuit (ASIC), or field programmable gate array (FPGA).

The memory 108 stores various information used or collected by the asset inspection device 100. For example, the memory 108 could include one or more memories storing instructions and data used by the controller 106 to perform various functions, such as a computer program executed by the controller 106. The memory 108 may also include one or more memories storing digital photographs, sound recordings, and other asset-related data. The memory 108 includes any suitable volatile and/or non-volatile storage and retrieval device or devices.

The display 110 includes any suitable structure for presenting information to a user, such as a liquid crystal display (LCD). The display 110 could be used, for example, to collect information associated with an asset from the user. The controls 112 include any suitable structure(s) allowing the user to control or adjust the operation of the asset inspection device 100, such as buttons initiating the capture of a digital image or the recording of the user's voice or other sound. The controls 112 could represent physical controls separate from the display 110 or soft controls presented on the display 110.

In this example, the asset inspection device 100 may include an asset detector 114. A user of the asset inspection device 100 may inspect a large number of assets, and the user may need a mechanism for associating a particular asset with particular data collected by the asset inspection device 100. In some embodiments, the asset detector 114 receives information that identifies an asset. Information for that asset can be collected and associated with that asset. The asset detector 114 includes any suitable structure for identifying assets. As examples, the asset detector 114 could represent a bar code reader capable of reading a bar code on or near an asset. The asset detector 114 could also represent a Radio Frequency Identification (RFID) chip capable of identifying an asset using data received in an RFID signal from a transmitter associated with the asset. In other embodiments, each asset could be uniquely identified by an alphanumeric or other code or identifier, and the user could provide this identifier to the asset inspection device 100 using the controls 112. In these embodiments, the asset detector 114 could be omitted.

As shown in FIG. 1, the asset inspection device 100 may further include an interface 116. The interface 116 allows the asset inspection device 100 to communicate and exchange information with an external system. For example, the interface 116 may allow the controller 106 to transmit digital photographs, sound recordings, and other data stored in the memory 108 to the external system. This could occur wirelessly or via a physical connection, such as when the asset inspection device 100 is inserted into a docking station. The interface 116 represents any suitable interface supporting wired or wireless communications.

In addition, the asset inspection device 100 includes a power supply 118. The power supply 118 supplies power to various components in the asset inspection device 100. The power supply 118 could represent any suitable source of operating power, such as a battery. In some embodiments, the power supply 118 may be capable of supplying power to the asset inspection device 100 for an extended period of time.

In one aspect of operation, the asset inspection device 100 could represent a portable device, such as a device carried by an inspector or other personnel in a processing or other environment. The camera 102 collects digital images of assets, while the sound recorder 104 collects the inspector's voice (such as oral notes) or other sounds associated with the assets. In addition, data could be collected from the inspector via one or more forms or other interactive documents presented on the display 110. The controller 106 can collect this data and transmit the data to an external system in real-time or store the information in the memory 108 for later retrieval. Other configurations or modes of operation of the asset inspection device 100 could also be used depending on the implementation.

In this way, the external system can receive (either in real-time or non-real-time) information associated with the inspection or examination of one or more assets. This allows the external system to perform various functions. For example, the external system could associate the data for a particular asset with that asset. This data could be stored and used to identify potential problems with the asset, to ensure that the required inspections of an asset have been performed, or to determine the wear of a particular asset over time. The external system could use this data in any other or additional manner to identify any other or additional characteristic of the asset.

Although FIG. 1 illustrates one example of an asset inspection device 100, various changes may be made to FIG. 1. For example, the asset inspection device 100 could include any number of each individual component, such as multiple displays or memories. Also, the functional division shown in FIG. 1 is for illustration only. Various components in FIG. 1 could be combined or omitted and additional components could be added according to particular needs. As a particular example, the asset detector 114 and the interface 116 could be integrated into a single wireless system that identifies assets and communicates with an external system. As another particular example, the controller 106 could form part part of the camera 102 (such as by using image data to generate a file representing an image) and part of the sound recorder 104 (such as by sampling digitized speech).

Figure 2:
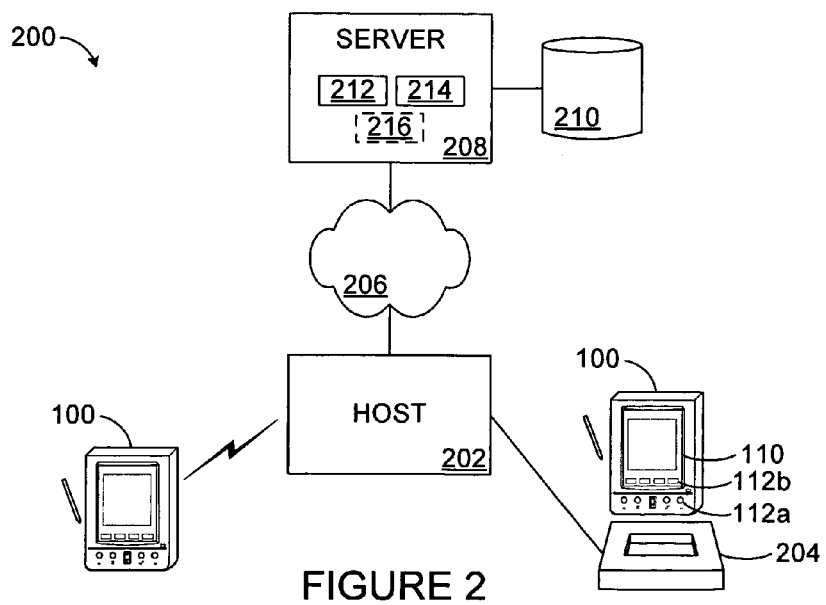
FIGS. 2 and 3 illustrate example systems for collecting information from asset inspection devices according to one embodiment of this disclosure.
Figure 3:
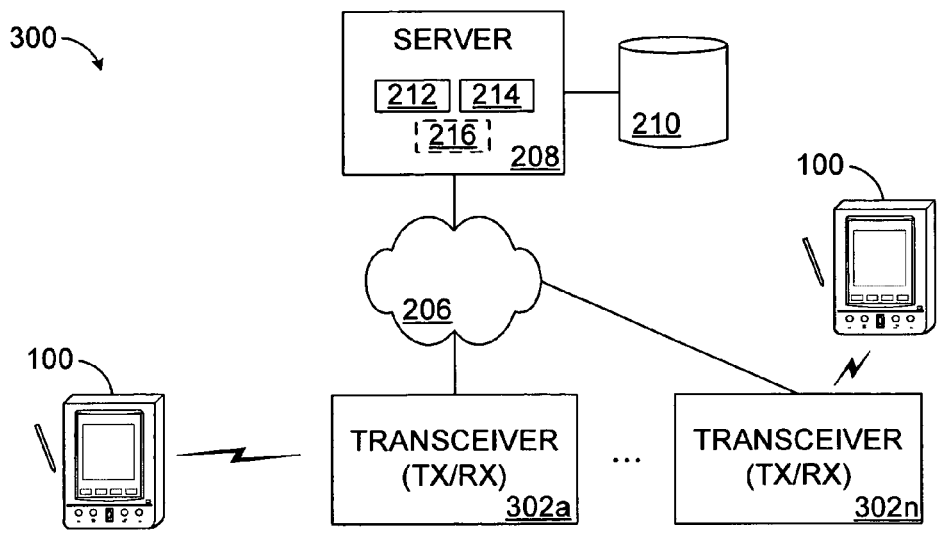

FIGS. 2 and 3 illustrate example systems for collecting information from asset inspection devices according to one embodiment of this disclosure. The embodiments of the systems shown in FIGS. 2 and 3 are for illustration only. Other embodiments of each system may be used without departing from the scope of this disclosure.

As shown in FIG. 2, a system 200 collects data from one or more asset inspection devices 100. In this example, the asset inspection devices 100 take the form of personal digital assistants (PDAs) or tablet personal computers (PCs). In these examples, the asset inspection devices 100 include a display 110, which can present various forms or other documents to a user. The asset inspection devices 100 also include controls 112a-112b, which can be used to interact with and control the asset inspection devices 100. In this example, the controls 112a represent physical controls (such as buttons), while the controls 112b represent soft controls presented on the display 110. The controls 112a-112b could be used to invoke any suitable functionality, such as the capture of an image, the recording of a voice or other sound, the identification of an asset, or the transmission of data to the system 200. In particular embodiments, the asset inspection devices 100 could represent Class 1 or Class 2 devices.

In this example, the asset inspection devices 100 can be used to store information associated with one or more assets being inspected, and this information is then downloaded to a host 202. The host 202 could represent any suitable device for receiving data from the asset inspection devices 100, such as a desktop computer, laptop computer, or other computing device. The host 202 may communicate with the asset inspection devices 100 in any suitable manner, such as through a docking station 204 or other wired or wireless connection.

The data collected by the host 202 can be transported over a network 206 to a server 208, which may store the data in a database 210. The network 206 facilitates communication between various components in the system 200. For example, the network 206 may communicate Internet Protocol (IP) packets, frame relay frames, Asynchronous Transfer Mode (ATM) cells, or other suitable information between network addresses. The network 206 may include one or more local area networks (LANs), metropolitan area networks (MANs), wide area networks (WANs), all or a portion of a global network such as the Internet, or any other communication system or systems at one or more locations.

The server 208 may represent any suitable device for storing and using the information collected by the asset inspection devices 100. In this example, the server 208 includes one or more processors 212 and one or more memories 214 capable of storing data and instructions used by the processors 212. As a particular example, the server 208 could include one or more applications 216 executed by the processor(s) 212. The applications 216 could use the data from the asset inspection devices 100 to perform a wide variety of functions. For example, an application 216 could perform text-to-speech conversion to convert speech recorded by an asset inspection device 100 into text for storage. The application 216 could also analyze the information collected during an asset inspection to identify problems with an asset, to identify the health of the asset or the processing or other environment, or to ensure that required inspections of the asset have been performed. The application 216 could perform any other or additional functions using the data from the asset inspection devices 100. As a particular example, the server 208 could implement a maintenance management system that manages the maintenance of various assets in a processing or other environment, and the server 208 could schedule maintenance for the assets based on the information from the asset inspection devices 100.

The database 210 represents any hardware, software, firmware, or combination thereof capable of storing and facilitating retrieval of information. The database 210 may also use any of a variety of data structures, arrangements, and compilations to store and facilitate retrieval of information. While shown as residing outside of and being coupled directly to the server 208, the database 210 could reside in any location or locations accessible by the server 208.

As shown in FIG. 3, a system 300 includes the network 206, server 208, and database 210 described above with respect to FIG. 2. In this example, the asset inspection devices 100 communicate with one or more transceivers 302a-302n. The transceivers 302a-302n could be distributed across a processing or other environment and are used to communicate with the asset inspection devices 100. The transceivers 302a-302n include any suitable structure for transmitting information to or receiving information from the asset inspection devices 100. The transceivers 302a-302n could, for example, represent radio frequency (RF) transmitters and receivers.

In some embodiments, the transceivers 302a-302n transmit beacon signals or other signals to the asset inspection devices 100, which allow the asset inspection devices 100 to identify the presence of the transceivers 302a-302n. The asset inspection devices 100 can then transmit data collected by the asset inspection devices 100 to the identified transceivers 302a-302n. In other embodiments, the asset inspection devices 100 could broadcast collected data for receipt by any nearby transceivers 302a-302n. Any other or additional communication scheme could be used to facilitate communication between the transceivers 302a-302n and the asset inspection devices 100.

The transmission of data to the transceivers 302a-302n could occur in any suitable manner. For example, an asset inspection device 100 could wait for a user to indicate that transmission of collected data is allowed, or the asset inspection device 100 could automatically transfer all or a subset of the collected data to the identified transceivers 302a-302n. In this way, the transceivers 302a-302n may allow real-time or near real-time collection of data from the asset inspection devices 100.

Although FIGS. 2 and 3 illustrate examples of systems for collecting information from asset inspection devices 100, various changes may be made to FIGS. 2 and 3. For example, the layout and arrangement of the systems could vary, and any number of hosts, networks, transceivers, servers, and databases could be used. Also, components could be combined or omitted and additional components could be added according to particular needs. Further, the transceivers 302a-302n could be replaced by transmitters or receivers based on the configuration and operation of the asset inspection devices 100. Beyond that, the asset inspection devices 100 could be used in any other suitable system. In addition, a combination of the systems 200 and 300 could be used, such as when data is transmitted to the server 208 through the transceivers 302a-302n and through the host 202.

Figure 4:
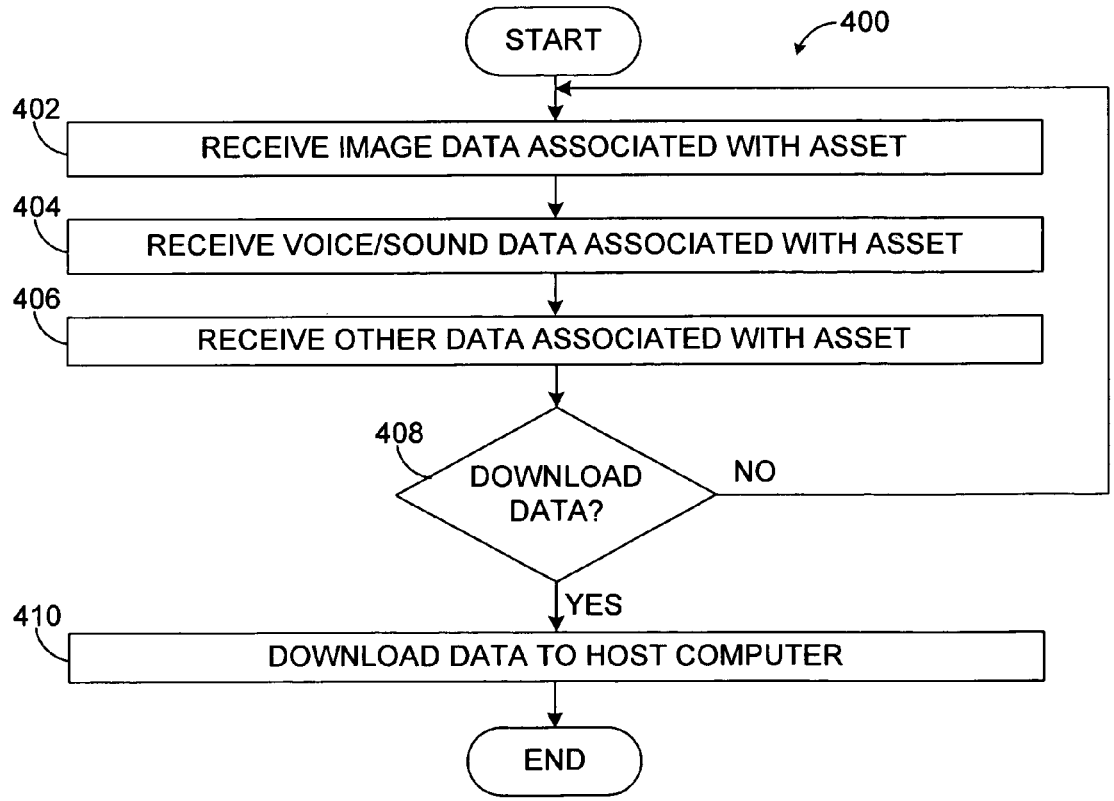
FIGS. 4 and 5 illustrate example methods for collecting information at an asset inspection device according to one embodiment of this disclosure.
Figure 5:
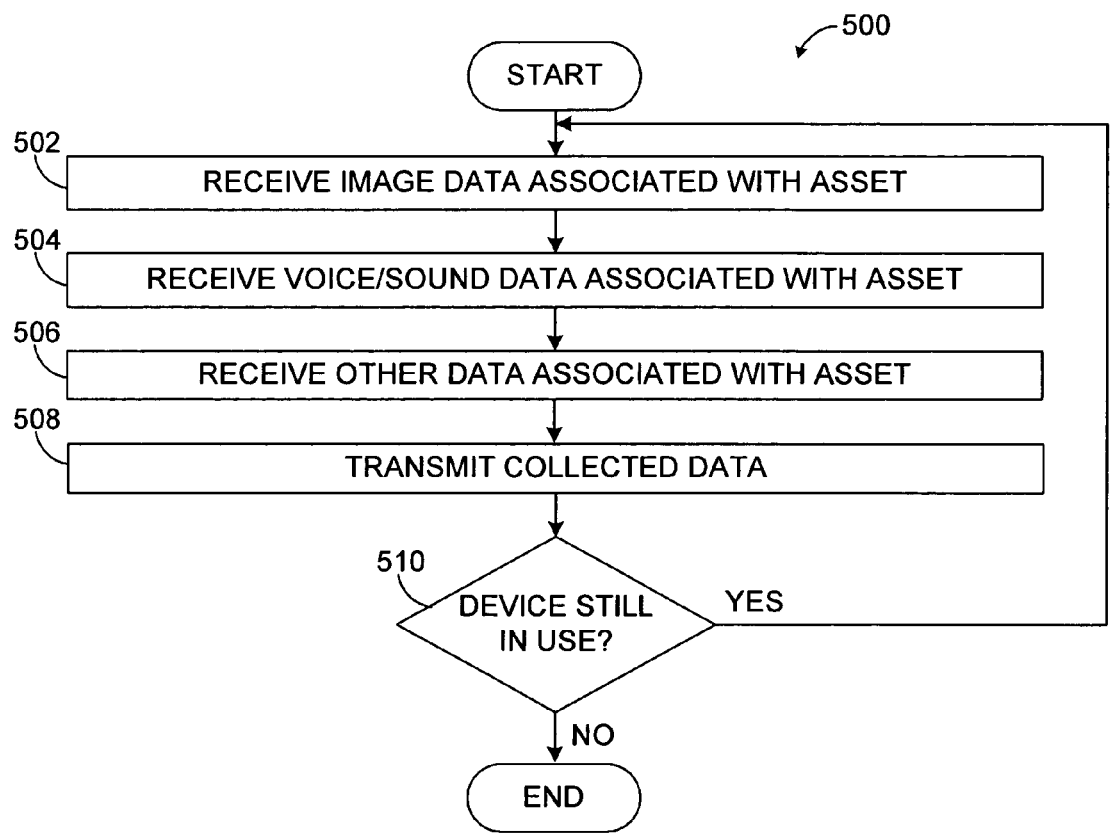

FIGS. 4 and 5 illustrate example methods for collecting information at an asset inspection device according to one embodiment of this disclosure. The embodiments of the methods shown in FIGS. 4 and 5 are for illustration only. Other embodiments of each method may be used without departing from the scope of this disclosure. Also, for ease of explanation, the methods in FIGS. 4 and 5 are described with respect to the asset inspection device 100 of FIG. 1 operating in the systems of FIGS. 2 and 3. The methods could be used with any other suitable device and in any other suitable system.

As shown in FIG. 4, a method 400 includes receiving image data associated with an asset at step 402. This could include a user using the camera 102 in the asset inspection device 100 to take a digital picture of an asset being inspected. Voice data or other sound data associated with the asset is received at step 404. This could include the user activating the sound recorder 104 in the asset inspection device 100 to record oral notes or other sounds during an inspection. Other data associated with the asset could be received at step 406. This could include the user using a form or other document presented on the display 110 of the asset inspection device 100 to check off items in a checklist, enter data using a physical or soft keyboard or number pad, or enter data using a stylus. The forms or other documents presented to the user could vary based on the asset or type of asset being inspected.

If it is not time to download the collected data at step 408, the method returns to step 402 to collect additional data, such as data associated with another asset. Otherwise, the collected data is downloaded to a host at step 410. This could include the controller 106 communicating the collected data from the memory 108 to the host 202 via the interface 116. The communication could involve wired or wireless communications.

As shown in FIG. 5, a method 500 includes receiving image data associated with an asset at step 502, voice or other sound data associated with the asset at step 504, and other data associated with the asset at step 506. The collected data is then communicated to an external system at step 508. This could include the controller 106 in the asset inspection device 100 communicating the collected data to a transceiver 302*a*-302*n* via the interface 116. The transmission of the collected data could occur automatically or require user input (such as user confirmation). If the asset inspection device 100 remains in use at step 510, the method returns to step 502 to collect additional data. Otherwise, no additional data is collected, and the method ends.

In FIG. 5, the transmission of data at step 508 could require the asset inspection device 100 to be within communication range with a transceiver, such as when the asset inspection device 100 can receive a beacon signal from the transceiver. If the asset inspection device 100 cannot detect a transceiver or is otherwise unable to transmit data to a transceiver, the asset inspection device 100 could store the data in the memory 108 for later transmission (either via a transceiver or a host).

Although FIGS. 4 and 5 illustrate examples of methods for collecting information at an asset inspection device 100, various changes may be made to FIGS. 4 and 5. For example, while shown as a series of steps, each method could include steps that overlap or that occur in parallel. Also, various ones of the steps in FIGS. 4 and 5 could be reordered. Further, the specific information collected in each method is for illustration only. Only a subset of the image, sound, and other data may be required for any particular asset being inspected. In addition, a combination of the methods 400 and 500 could be used, such as when data is transmitted in real-time and also stored for later downloading (to ensure no data is lost during real-time transmission).

Figure 6:
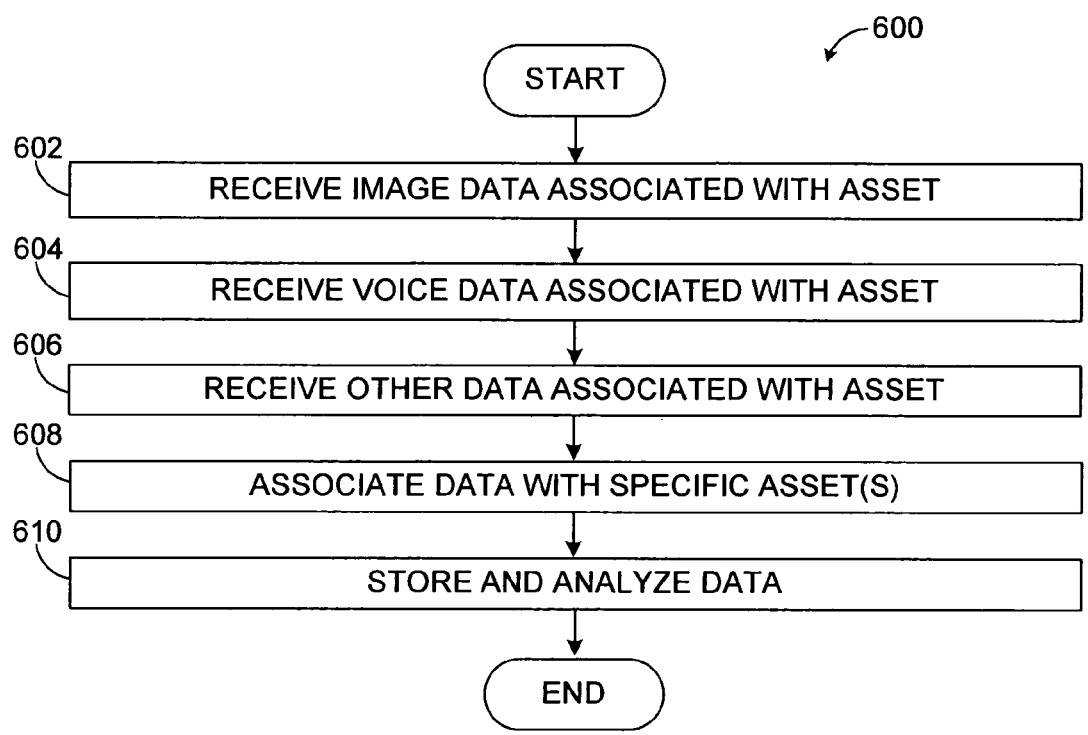
FIG. 6 illustrates an example method for collecting information from an asset inspection device according to one embodiment of this disclosure.

FIG. 6 illustrates an example method 600 for collecting information from an asset inspection device according to one embodiment of this disclosure. The embodiment of the method 600 shown in FIG. 6 is for illustration only. Other embodiments of the method 600 may be used without departing from the scope of this disclosure. Also, for ease of explanation, the method 600 is described with respect to the asset inspection device 100 of FIG. 1 operating in the systems of FIGS. 2 and 3. The method 600 could be used with any other suitable device and in any other suitable system.

As shown in FIG. 6, the method 600 includes receiving image data associated with an asset at step 602, voice or other sound data associated with the asset at step 604, and other data associated with the asset at step 606. This may include, for example, the server 208 receiving the data from an asset inspection device 100 via a host 202 or via one or more transceivers 302*a*-302*n*.

The received data is associated with one or more specific assets at step 608. This could include the server 208 using asset identifiers included in the received data to associate the received data with the corresponding asset(s). As particular examples, this could include the server 208 using alphanumeric identifiers entered by a user or captured by the asset inspection device 100. As another particular example, this could include the server 208 using a textual description of an asset (such as "valve #6 in pipe #23 in tower #2") to identify a particular asset. Any other technique could be used to identify an asset associated with received data. Any ambiguity in the identification of an asset could be resolved by communicating with a user (such as via the asset inspection device 100 or a host 202) to verify the identity of an asset or to collect additional information regarding an asset.

At this point, the data is stored and analyzed at step 610. This could include storing the data in the database 210. The storage could occur in any suitable manner. For example, the image, voice/sound, and other data could be stored separately or together. The analysis of the data could involve any suitable analysis, such as an application 216 analyzing the data to schedule maintenance for assets, identify problems with assets, or confirm inspections were completed. The results of the analyses could be presented in any suitable manner, such as a graphical display or printed report.

Although FIG. 6 illustrates one example of a method 600 for collecting information from an asset inspection device, various changes may be made to FIG. 6. For example, while shown as a series of steps, the method 600 could include steps that overlap or that occur in parallel. Also, the data associated with operation of one or more asset inspection devices 100 could be used in any other or additional manner.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A portable apparatus, comprising:
a camera operable to capture images associated with an inspection of each of multiple assets;
a sound recorder operable to, concurrent with the capture of the images, capture sounds associated with the inspection of each of the assets, the sounds related to the images and including one or more oral notes from a user inspecting each of the assets and one or more sounds associated with an operation of each of the assets;
a detector operable to automatically identify each of the assets at the portable apparatus;
a display operable to present a checklist relating to the inspection of at least one of the assets;
a controller configured to associate at the portable apparatus the images of the assets and the sounds associated with the inspection of the assets with information identifying the assets;
a memory configured to store the images of the assets, the sounds associated with the inspection of the assets, and the information identifying the assets; and
an interface operable to transmit the images of the assets, the sounds associated with the inspection of the assets, and the information identifying the assets;
wherein the apparatus is further configured to compare at least one of the images of the assets, the sounds associated with the inspection of the assets, and the information identifying the assets with data relating to at least one of the assets in order to perform an examination of the at least one of the assets; and
wherein the interface is operable to transmit the images, the sounds, and the information identifying the assets to a server that is configured to:
analyze the images and the sound recordings to determine characteristics of each of the assets including a health of each of the assets and any identified problems associated with the assets;
verify that required inspections of the assets have been performed; and
in response to detecting an ambiguity in the information identifying one of the assets, at least one of: collect additional information regarding the specific asset from the user and request verification of the identity of the asset from the user.

2. The apparatus of claim 1, wherein the interface is operable to transmit the images, the sounds, and the information identifying the assets to the server over a frame relay network.

3. The apparatus of claim 1, wherein:
the display is operable to present forms to a user;
the apparatus further comprises one or more controls operable to receive input from the user, the input comprising data associated with the assets; and
the interface is further operable to transmit the data provided by the user.

4. The apparatus of claim 1, wherein the controller is further operable to control operation of at least one of: the camera, the sound recorder, and the interface.

5. The apparatus of claim 4, wherein the controller forms part of at least one of: the camera and the sound recorder.

6. The apparatus of claim 1, wherein the interface comprises a wireless interface.

7. The apparatus of claim 1, wherein the detector comprises a radio frequency identification (REED) detector.

8. A method, comprising:
capturing, at a portable device, images associated with an inspection of each of multiple assets;
concurrent with the capture of the images, recording sounds associated with the inspection of each of the assets at the portable device, the sounds related to the images and including one or more oral notes from a user inspecting each of the assets and one or more sounds associated with an operation of each of the assets;
automatically identifying the assets at the portable device;
presenting a checklist relating to the inspection of at least one of the assets on a display of the portable device;
associating at the portable device the images of the assets and the sounds associated with the inspection of the assets with information identifying the assets;
storing the images of the assets, the sounds associated with the inspection of the assets, and the information identifying the assets at the portable device;
communicating the images of the assets, the sounds associated with the inspection of the assets, and the information identifying the assets;
comparing at least one of the images of the assets, the sounds associated with the inspection of the assets, and the information identifying the assets with data relating to at least one of the assets in order to perform an examination of the at least one of the assets;
analyzing the images and the sound recordings to determine characteristics of each of the assets including a health of each of the assets and any identified problems associated with the assets;
verifying that required inspections of the assets have been performed; and
in response to detecting an ambiguity in the information identifying one of the assets, at least one of: collecting additional information regarding the specific asset from the user and requesting verification of the identity of the asset from the user.

9. The method of claim 8, further comprising:
transmitting the images and the sound recordings over a frame relay network.

10. The method of claim 8, further comprising:
presenting forms to a user on the display of the portable device; and
receiving input from the user through one or more controls of the portable device, the input comprising data associated with the assets;
wherein communicating the image of the assets, the sounds associated with the inspection of the assets, and the information identifying the assets comprises communicating the data provided by the user along with the images, the sounds, and the information identifying the assets.

11. The method of claim 8, wherein communicating the image of the assets, the sounds associated with the inspection of the assets, and the information identifying the assets comprises communicating the images, the sounds, and the information identifying the assets after the portable device is inserted into a docking station.

12. The method of claim 8, wherein communicating the image of the assets, the sounds associated with the inspection of the assets, and the information identifying the assets comprises communicating the images, the sounds, and the information identifying the assets to a radio frequency receiver.

13. The method of claim 8, wherein the assets comprise equipment in an industrial processing facility.

14. The method of claim 8, wherein automatically identifying the assets comprises receiving Radio Frequency Identification (RFID) signals identifying the assets at the portable device.

15. A non-transitory computer readable medium embodying a computer program, the computer program comprising:
- computer readable program code for receiving (i) an image associated with an inspection of a specific asset, (ii) sound recordings associated with the inspection of the specific asset, the sound recordings related to the images and including one or more oral notes from a user inspecting the specific asset and one or more sounds associated with an operation of the specific asset, the sound recordings received concurrent with the images, and (iii) information identifying the specific asset;
- computer readable program code for presenting a checklist relating to the inspection of the specific asset on a display;
- computer readable program code for performing speech-to-text conversion of the one or more oral notes to produce converted text;
- computer readable program code for associating the received image, the sound recordings, and the converted text with the specific asset using the information identifying the specific asset; and
- computer readable program code for analyzing the image and at least one of the sound recordings to determine characteristics of the specific asset, wherein the characteristics comprise a health of the specific asset and any identified problems associated with the specific asset by relating the identified characteristics of the specific asset with previous data associated with at least one characteristic of the specific asset;
- computer readable program code for verifying that required inspections of the specific asset have been performed; and
- computer readable program code for, in response to detecting an ambiguity in the information identifying the specific asset, at least one of: collecting additional information regarding the specific asset from the user and requesting verification of the identity of the specific asset from the user.

16. The computer readable medium of claim 15, wherein the information identifying the specific asset comprises radio frequency identification (RFID) information.

17. The computer readable medium of claim 15, wherein the characteristics of the specific asset further comprise a maintenance schedule for the specific asset.

18. The computer readable medium of claim 15, wherein the computer readable program code for receiving the image, the sound recordings, and the information identifying the specific asset comprises computer readable program code for receiving the image, the sound recordings, and the information identifying the specific asset through at least one of:
- a receiver operable to wirelessly receive the image, the sound recordings, and the information identifying the specific asset in real-time from a portable device; and
- a host computer operable to receive the image, the sound recordings, and the information identifying the specific asset in non-real-time from the portable device.

19. The computer readable medium of claim 15, wherein:
- the computer readable program code for receiving the image, the sound recordings, and the information identifying the specific asset comprises computer readable program code for receiving multiple images of multiple assets and multiple sound recordings associated with multiple inspections of the assets; and
- the computer readable program code for associating the received image, the sound recordings, and the converted text comprises computer readable program code for associating each of the received images and sound recordings with one of the assets.

20. The computer readable medium of claim 15, further comprising:
- computer readable program code for transmitting the image and the sound recordings over a frame relay network.

* * * * *